(12) United States Patent
Koopmann

(10) Patent No.: US 7,695,388 B2
(45) Date of Patent: Apr. 13, 2010

(54) ACTIVATION CONTROL DEVICE FOR THE CLUTCH PACKS OF A HYDRAULIC DOUBLE CLUTCH

(75) Inventor: Laurent Koopmann, Zedelgem (BE)

(73) Assignee: Hoerbiger Antriebstechnik GmbH, Schongau (DE)

( * ) Notice: Subject to any disclaimer, the term of this patent is extended or adjusted under 35 U.S.C. 154(b) by 0 days.

(21) Appl. No.: 11/924,392

(22) Filed: Oct. 25, 2007
(Under 37 CFR 1.47)

(65) Prior Publication Data

US 2009/0131219 A1  May 21, 2009

Related U.S. Application Data

(63) Continuation of application No. PCT/EP2006/003825, filed on Apr. 25, 2006.

(30) Foreign Application Priority Data

Apr. 25, 2005  (EP) .................... 05009008

(51) Int. Cl.
*F16H 31/00* (2006.01)
(52) U.S. Cl. ................. 475/121; 475/116; 475/119
(58) Field of Classification Search .......... 475/116, 475/119–123
See application file for complete search history.

(56) References Cited

U.S. PATENT DOCUMENTS

| | | | | |
|---|---|---|---|---|
| 4,030,381 A | * | 6/1977 | Lalin et al. ............ 477/151 |
| 4,657,041 A | * | 4/1987 | Mitsui ................. 137/116.3 |
| 5,103,954 A | * | 4/1992 | Muncke et al. ........... 192/3.58 |
| 5,368,531 A | * | 11/1994 | Ando et al. ............... 477/155 |
| 5,573,473 A | * | 11/1996 | Asayama et al. ........... 477/63 |
| 6,328,674 B1 | * | 12/2001 | Matsue et al. ............ 477/155 |
| 6,357,229 B1 | * | 3/2002 | Schust et al. ............. 60/357 |
| 6,889,811 B2 | * | 5/2005 | Ebert et al. ............ 192/87.13 |
| 7,441,643 B2 | * | 10/2008 | McCunn et al. ......... 192/87.13 |
| 2007/0186548 A1 | * | 8/2007 | Smith et al. .............. 60/413 |

FOREIGN PATENT DOCUMENTS

| | | |
|---|---|---|
| EP | 0 356 527 | 3/1990 |
| EP | 1 503 101 | 2/2005 |
| JP | 61252922 | 11/1986 |

* cited by examiner

*Primary Examiner*—Ha D. Ho
(74) *Attorney, Agent, or Firm*—Tarolli, Sunheim, Covell & Tummino LLP

(57) ABSTRACT

An activation control device for clutch packs of a hydraulic double clutch is described and illustrated, and in some embodiments comprises a first pressure line having a filling valve and leading from an oil pressure source to the first clutch pack; a second pressure line having a filling valve and leading from the oil pressure source to the second clutch pack; and first and second draining valves coupled to the first and second pressure lines, respectively, the first draining valve located between the filling valve of the first pressure line and the first clutch pack, and the second draining valve located between the filling valve of the second pressure line and the second clutch pack.

16 Claims, 1 Drawing Sheet

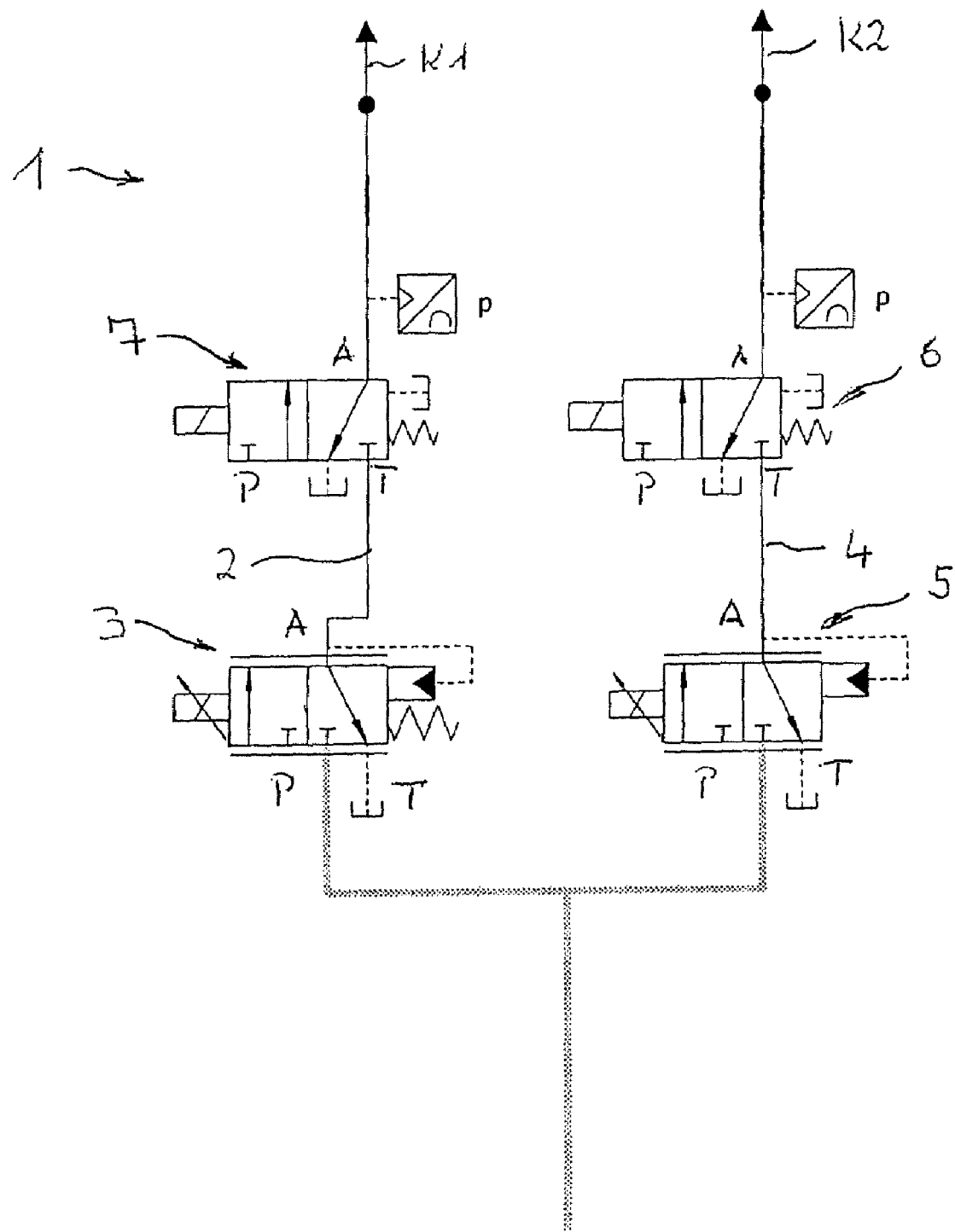

ACTIVATION CONTROL DEVICE FOR THE CLUTCH PACKS OF A HYDRAULIC DOUBLE CLUTCH

CROSS-REFERENCE TO RELATED APPLICATIONS

This is a continuation of PCT/EP2006/003825 filed on Apr. 25, 2006, and claims priority to European patent application no. 05009008.3 filed on Apr. 25, 2005. The entire contents of both earlier-filed applications are incorporated herein by reference.

FIELD OF THE INVENTION

The present invention relates to activation control devices for clutch packs of hydraulic double clutches.

BACKGROUND

Hydraulic double clutches are used for double clutch transmissions, and comprise first and second pressure lines leading from an oil pressure source via respective filling valves in each pressure line to first and the second clutch packs, respectively.

SUMMARY

It is an object underlying the present invention to provide an activation control device having improved and/or safer operating characteristics.

The activation control device according to an embodiment of the present invention comprises a draining valve in each of the pressures lines between the filling valve and the clutch pack. This provides the advantage of minimizing pressure drop upon draining, and provides a redundant control option in case of valve failure. Therefore, as both pressure lines comprise one valve primarily intended for supplying oil to the clutch packs and thus controlling the clutch pressure, and another valve for the purpose of shortening the reaction time of the entire activation control device, torque transmission can be optimized.

In some embodiments, the filling valve is a proportional pressure reducing valve. Also in some embodiments, the draining valve is preferably an on-off 3/2 valve.

In some embodiments, the diameter of the spool of the draining valve is bigger than the diameter of the spool of the filling valve.

Furthermore, in some embodiments the draining valves have a symmetric spool design, whereas the filling valves have an asymmetric spool design. However, in other embodiments, both valve types have the same spool design.

Further features and advantages of the present invention will become apparent from the following description of the single FIGURE of the drawings.

BRIEF DESCRIPTION OF THE DRAWING

The accompanying drawing is a schematic view of an activation control device for clutch packs of a hydraulic double clutch.

DETAILED DESCRIPTION

The accompanying drawing is a schematically simplified depiction of an activation control device 1 for clutch packs (represented by arrows $K_1$ and $K_2$) of a hydraulic double clutch used with a double clutch transmission (not shown).

The activation control device 1 comprises a first pressure line 2 equipped with a filling valve 3, and a draining valve 7 downstream of the filling valve 3. Therefore, the draining valve 7 is disposed between the filling valve 3 and the clutch pack $K_1$.

Furthermore, a second pressure line 4 in parallel is provided with a filling valve 5 and a draining valve 6 downstream of filling valve 5, so that the draining valve 6 is disposed between filling valve 5 and the clutch pack $K_2$.

The pressure lines 2 and 4 are connected to an oil pressure source not shown in the FIGURE.

The connections of the valve terminals P, T, A to the pressure lines 2 and 4 can be understood with reference to the accompanying FIGURE.

What is claimed is:

1. An activation control device for clutch packs of a hydraulic double clutch, the activation control device comprising:

a first pressure line having a filling valve and leading from an oil pressure source to the first clutch pack, the first clutch pack actuatable by actuation of the filling valve of the first pressure line;

a second pressure line having a filling valve and leading from the oil pressure source to the second clutch pack, the second clutch rack actuatable by actuation of the filling valve of the second pressure line; and first and second draining valves coupled to the first and second pressure lines, respectively, the first draining valve coupled in series between the filling valve of the first pressure line and the first clutch pack, and the second draining valve coupled in series between the filling valve of the second pressure line and the second clutch pack.

2. The activation control device of claim 1, wherein at least one of the filling valves is a proportional pressure reducing valve, and at least one of the draining valves is an on-off 3/2 valve.

3. The activation control device of claim 1, wherein each draining and filling valve has a respective spool, and wherein the diameters of the draining valve spools are larger than the diameters of the filling valve spools.

4. The activation control device of claim 2, wherein each draining and filling valve has a respective spool, and wherein the diameters of the draining valve spools are larger than the diameters of the filling valve spools.

5. The activation control device of claim 1, wherein each of the draining valves have a symmetric spool design.

6. The activation control device of claim 2, wherein each of the draining valves have a symmetric spool design.

7. The activation control device of claim 3, wherein each of the draining valves has a symmetric spool design.

8. The activation control device of claim 1, wherein each of the filling valves has an asymmetric spool design.

9. The activation control device of claim 2, wherein each of the filling valves has an asymmetric spool design.

10. The activation control device of claim 3, wherein each of the filling valves has an asymmetric spool design.

11. The activation control device of claim 5, wherein each of the filling valves has an asymmetric spool design.

12. The activation control device of claim 1, wherein the first and the second pressure lines are disposed in parallel, and branch from a common pressure line to the oil pressure source.

13. The activation control device of claim 2, wherein the first and the second pressure lines are disposed in parallel, and branch from a common pressure line to the oil pressure source.

14. The activation control device of claim 3, wherein the first and the second pressure lines are disposed in parallel, and branch from a common pressure line to the oil pressure source.

15. The activation control device of claim 5, wherein the first and the second pressure lines are disposed in parallel, and branch from a common pressure line to the oil pressure source.

16. The activation control device of claim 8, wherein the first and the second pressure lines are disposed in parallel, and branch from a common pressure line to the oil pressure source.

\* \* \* \* \*